United States Patent [19]

Reed

[11] 4,272,994
[45] Jun. 16, 1981

[54] CONSTANT PRESSURE APPARATUS AND METHOD

[75] Inventor: Edwin E. Reed, Bartlesville, Okla.

[73] Assignee: Phillips Petroleum Company, Bartlesville, Okla.

[21] Appl. No.: 44,810

[22] Filed: Jun. 1, 1979

[51] Int. Cl.³ .............................................. G01N 3/10
[52] U.S. Cl. ...................................................... 73/807
[58] Field of Search ......................... 73/15.6, 807, 813; 219/332, 496; 126/369

[56] References Cited

U.S. PATENT DOCUMENTS

| | | | |
|---|---|---|---|
| 2,785,272 | 3/1957 | Baly | 219/496 |
| 2,911,511 | 11/1959 | Megarry | 219/332 |
| 3,199,341 | 8/1965 | Heuer, Jr. et al. | 73/807 |

Primary Examiner—Donald O. Woodiel

[57] ABSTRACT

A method and apparatus for maintaining a constant elevated liquid pressure in a small vessel by pressuring with liquid the small vessel and a larger vessel in open communication therewith. The larger vessel, preferably, has a volume of about 20 to about 100 times the volume of the smaller vessel. In one embodiment the mechanical pressuring is reapplied to maintain a constant pressure in the vessels. In another embodiment, the temperature of the liquid in the larger vessel is manipulated to maintain pressure in the vessels.

3 Claims, 1 Drawing Figure

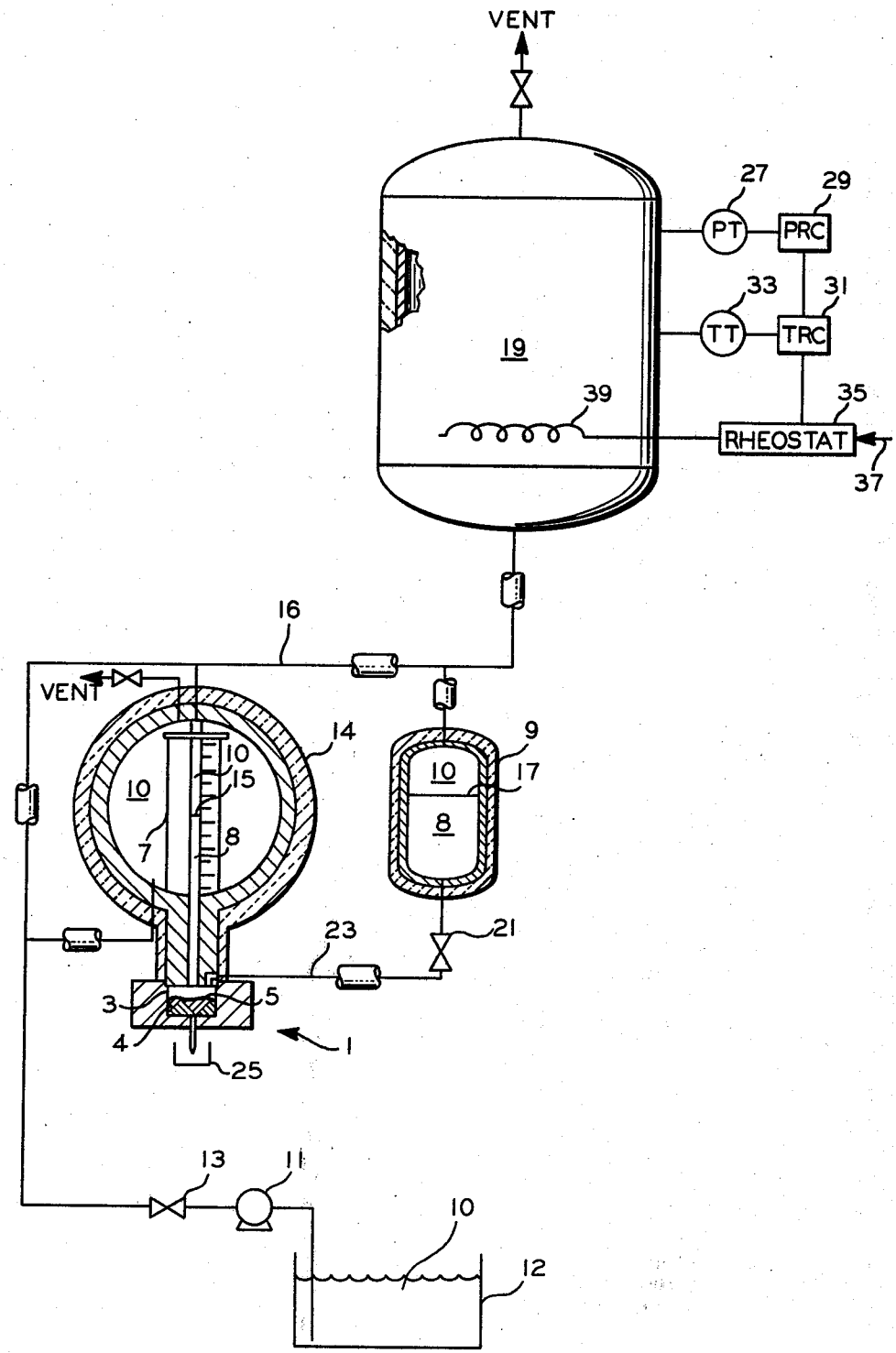

CONSTANT PRESSURE APPARATUS AND METHOD

BACKGROUND OF THE INVENTION

This invention relates to pressure vessels. In one of its aspects, this invention relates to maintaining a constant pressure within a vessel. In another of its aspects, this invention relates particulalry to testing apparatus requiring maintenance of a constant pressure.

In the evaluation of certain geological samples, it is desirable to hold the sample under a constant pressure for a considerable length of time. For such service, a compaction cell is used. Using such an apparatus a pressure of 25 lbs/sq. in., or lower, up to 30,000 lbs/sq. in., or more, can be maintained on a sample for a period of up to 6 months.

A compaction apparatus has a very small liquid pressure chamber which usually contains about a pint of fluid. Considering the size of the container, the length of time the pressure is to be applied, and the very high pressures involved, it is evident that using the more conventional pressure maintainance equipment in this service involves problems which makes the necessary constant monitoring impractical. This invention provides a method and apparatus for maintaining the required pressure on a system such as a compaction cell or pther small vessel requiring a constant pressure over an extended period of time.

It is therefore an object of this invention to provide a method and apparatus for maintaining a constant elevated hydraulic pressure in a small vessel.

Other aspects, objects and the various advantages of this invention will become apparent upon reading the specification and the appended claims.

STATEMENT OF THE INVENTION

In accordance with the invention, an apparatus is provided for maintaining a constant elevated hydraulic pressure in a small vessel. The apparatus is composed of (1) the small vessel on which the constant elevated liquid pressure is to be maintained, (2) a vessel having a volume of about 20 to about 100 times the volume capacity of the small vessel, (3) means of open communication between the vessels, and (4) means for pressuring the vessels with liquid.

In a preferred embodiment of the invention there are also means for manipulating the temperature of the liquid in the larger vessel.

In an embodiment of the invention a method is provided for maintaining a constant elevated liquid pressure in a small vessel. In the method, the small vessel (14), a larger vessel (19) which is capable of containing a volume of liquid of about 20 to about 100 times the capacity of the small vessel, and a means (16) of open passage between the vessels are all filled with liquid, and the liquid in the vessels is pressured intermittently to maintain a constant pressure.

In a preferred embodiment, the temperature of the liquid in the larger vessel is then manipulated to maintain a constant pressure in the vessels.

Any liquid is suitable for use in the present apparatus as long as the liquid is compatible with the material of construction of the apparatus. Since this invention is most applicable to an apparatus used as a testing device, there is likely to be gasketing material of synthetic or natural rubber or other elastic or plastic material with which the liquid will come in contact. To avoid deterioration of these materials various liquids including mercury, water, and various grades of hydraulic oil will most commonly be used.

When there is a manipulation of the temperature of the liquid in the larger vessel, it is possible to monitor the temperature and pressure in the larger vessel using guages attached to the vessel and control by hand the input of heat into a jacket or immersion type heater which can be a heating coil with liquid circulating therethrough, an electric heater, or other common heating means. It is preferred, however, that control be automatic with a pressure sensing element providing a signal or a pressure recorder controller which controls the set point on a temperature recorder controller which also senses the temperature of the liquid in the larger vessel thereby providing a signal to control the input of heat into the vessel. Maintaining temperature at a desired level within the vessels and connecting passages is facilitated by insulation of as much of the equipment as possible thereby minimizing heat exchange from the surface of the equipment.

This invention can best be understood in conjunction with the drawing which is a schematic representation of the apparatus of this invention used as a pressure control system with a compaction cell. Although the compaction cell forms no part of this invention, its operation will be described to emphasize the importance of maintaining a constant pressure.

Referring now to the drawing, a compaction cell (1) is composed of a sample compartment (3) in which a sample (4) is placed beneath the rubber diaphram (5) above which is a leg of mercury extending upward from the diaphram into a graduated scale (7). Another leg of mercury (8) extends to a mercury reservoir (9) which is elevated above the graduated scale.

In operation, after the sample is in place, oil (10) is supplied from a reservoir (12) by a pressure pump or other means (11) through a valve (13) into the cell and into the mercury reservoir (9) where it forms an interface, (15) and (17) respectively, with the mercury. According to the present invention, at the same time the larger vessel (19) is also filled with oil.

The valve (21) in the passage (23) from the mercury reservoir (9) is opened to force mercury to the top of the graduated scale (7) and into contact with the rubber gasket (5). Valve (21) is then closed. As the sample is compacted, the mercury falls in the graduated cylinder. Valve (21) is opened periodically to raise the mercury back to the top of the scale. Liquid such as oil, water, etc. is expelled from the sample into the collection means (25) for analysis. The compaction test may continue for six months or until compaction ceases.

In the present process, liquid is pumped into the larger vessel (19) intermittently until a constant pressure is registered in the vessel (19). For a test requiring a short period of time, additional intermittent pumping can be required when the indicated pressure in vessel (19) is lowered.

Preferably, however, the pressure in vessel (19) will be constantly monitored by a sensing element such as a pressure transducer (27) which transmits a signal to pressure recorder controller (29) which signals temperature recorder controller (31) that pressure in the vessel has changed. A temperature sensing element such as a transducer (33) also transmits a signal indicating the temperature in vessel (19) to temperature recorder controller (31). This controller transmits a signal to a rheostat (35) which controls the supply of electricity from (37) to an electric heater (39) within the vessel (19). The pressure in vessel (19) is thereby constantly maintained by heating the relatively large volume of liquid in that vessel to keep it properly expanded.

I claim:

1. An apparatus or maintaining a constant elevated liquid pressure in a small, liquid filled vessel, said apparatus comprising:
   (a) a small, liquid filled vessel, said small vessel requiring substantially constant pressure as part of a testing system;
   (b) in open communication therewith a vessel having a volume of about 20 to about 100 times the volume of said small vessel;
   (c) means for filling said vessels with liquid at a constant pressure; and
   (d) means for sensing and manipulating the temperature of liquid in said larger vessel to maintain a substantially constant pressure within the apparatus.

2. An apparatus of claim 1 wherein said means of manipulating the temperature comprises means for sensing the pressure in larger vessel, generating a signal representative thereof which is transmitted to control a temperature controller which generates a signal in response thereto to control sufficient inlet of heat into the larger vessel to maintain said pressure within said vessel.

3. A method for maintaining a constant elevated liquid pressure in a small, liquid filled vessel, said method comprising: pressuring sufficient liquid into a system comprising (1) a small, liquid filled vessel requiring substantially constant pressure as part of a testing system, (2) a vessel capable of containing a volume of liquid of about 20 to about 100 times that of the small vessel, and (3) a means of passage between said vessels to fill said system with liquid at a constant pressure and, thereafter, sensing and manipulating the temperature of the liquid in the larger vessel to maintain a substantially constant pressure in the system.

* * * * *

UNITED STATES PATENT AND TRADEMARK OFFICE
CERTIFICATE OF CORRECTION

PATENT NO. : 4,272,994

DATED : June 16, 1981

INVENTOR(S) : Edwin E. Reed

It is certified that error appears in the above-identified patent and that said Letters Patent are hereby corrected as shown below:

Column 3, line 7, delete "or" and insert therefor --- for ---.

Signed and Sealed this

Twentieth Day of October 1981

[SEAL]

Attest:

GERALD J. MOSSINGHOFF

Attesting Officer     Commissioner of Patents and Trademarks